(12) United States Patent
Garcez da Silva et al.

(10) Patent No.: US 9,267,658 B2
(45) Date of Patent: Feb. 23, 2016

(54) INTEGRAL AIR VENT AND LAMP ASSEMBLY

(71) Applicant: GM GLOBAL TECHNOLOGY OPERATIONS LLC, Detroit, MI (US)

(72) Inventors: Carlos Augusto Garcez da Silva, São Paulo (BR); Eduardo Horvat Lofrano, Santo Andre (BR); Rogerio Rodrigues Leite, São Paulo (BR); Eduardo Prisco Rodrigues, São Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 14/069,724

(22) Filed: Nov. 1, 2013

(65) Prior Publication Data

US 2015/0124471 A1    May 7, 2015

(51) Int. Cl.
*F21S 8/10* (2006.01)
*B60Q 3/00* (2006.01)
*B60Q 3/02* (2006.01)
*F21S 8/02* (2006.01)

(52) U.S. Cl.
CPC ............... *F21S 48/30* (2013.01); *B60Q 3/001* (2013.01); *B60Q 3/0203* (2013.01); *B60Q 3/0286* (2013.01); *B60Q 2500/20* (2013.01)

(58) Field of Classification Search
CPC .. B60Q 2500/20; B60Q 3/001; B60Q 3/0203; B60Q 3/0286; F21S 48/30

USPC ............... 362/249.02, 480, 487–490
See application file for complete search history.

(56) References Cited

U.S. PATENT DOCUMENTS

| | | | | |
|---|---|---|---|---|
| 1,722,825 A | * | 7/1929 | Roethel | B60H 1/00464 248/343 |
| 2008/0060922 A1 | * | 3/2008 | Su | H01H 1/5866 200/329 |
| 2012/0236569 A1 | * | 9/2012 | Chang | F21V 3/02 362/294 |

* cited by examiner

*Primary Examiner* — Anh Mai
*Assistant Examiner* — Nathaniel Lee
(74) *Attorney, Agent, or Firm* — Quinn Law Group, PLLC

(57) ABSTRACT

An integral air vent and lamp assembly for a vehicle passenger cabin includes a rotary vent housing and a hub defining an opening centered on a center axis of the vent housing having vent doors which open and close to admit or block airflow into the cabin. A lamp subassembly is disposed within the opening. The lamp subassembly may include a push-button microswitch and light-emitting diodes (LEDs). A light diffusing lens and LED board may be positioned within a recess of an elongated T-shaped housing, which may include an axial member received by and rotating in conjunction with a gear element. The diffusing lens and LED board may be circumscribed by a bezel. A vehicle includes a power source, a body defining a passenger cabin, an air circulation device configured to move air to the passenger cabin, and the integral air vent and lamp assembly positioned in the passenger cabin.

16 Claims, 3 Drawing Sheets

INTEGRAL AIR VENT AND LAMP ASSEMBLY

TECHNICAL FIELD

The present disclosure relates to an integral air vent and lamp assembly.

BACKGROUND

Passenger cabins of modern vehicles may include an array of devices, each of which is intended to improve passenger enjoyment or ride comfort in a particular manner. Typical passenger cabin devices include front and rear air vents, overhead reading lamps, ambient lighting strips, USB ports, electrical charging ports, DVD players, and the like. The various devices, which are typically separate from each other, may be grouped together in a single overhead panel in close proximity to heating, ventilation, and air conditioning (HVAC) ductwork.

SUMMARY

An integral air vent and lamp assembly is disclosed herein. The assembly may be used in a vehicle having a power source and an air circulation device, i.e., an air conditioning fan or blower. As used herein, the term "integral" means "consisting of parts that together constitute a whole", i.e., the integral air vent and lamp assembly includes both an air vent and a lamp suitable for reading or other tasks. The term "vehicle" refers to any mobile platform which transports passengers, including any motor vehicle, airplane, train, or boat, in which air conditioning and lighting are provided.

In an example embodiment, the air vent and lamp assembly includes a rotary vent housing and a lamp subassembly. The lamp subassembly is disposed within the rotary vent housing. The rotary vent housing, which is in fluid communication with the air circulation device, has a pair of vent doors that open or close to admit or block a flow of air from the air circulation device into the passenger cabin. The rotary vent housing also has a hub that defines an opening. The lamp subassembly is electrically connectable to the power source and is disposed within the hub opening.

A vehicle as set forth herein includes a power source, a body that defines a passenger cabin, an air circulation device that circulates air to the passenger cabin, and the integral air vent and lamp assembly noted above. The rotary vent housing is positioned in the passenger cabin in fluid communication with the air circulation device, and has a hub that defines an opening centered on a center axis of the rotary vent housing. A lamp subassembly disposed within the hub opening is electrically connected to the power source.

In another embodiment, an integral air vent and lamp assembly includes a rotary vent housing in fluid communication with the air circulation device. The rotary vent housing includes a hub that defines an opening centered on a center axis of the rotary vent housing. The integral air vent and lamp assembly includes a lamp subassembly that is disposed within the hub opening and that includes an elongated T-shaped member. The elongated T-shaped member defines a recess and an axial center channel. The lamp subassembly also includes a light-emitting diode (LED) board with a plurality of LEDs, a push-button micro-switch, and a light diffusing lens covering the LED board, which may be electrically connected to the power source. The light diffusing lens and the LED board are disposed within the defined recess of the elongated T-shaped member.

The above features and advantages and other features and advantages of the present invention are readily apparent from the following detailed description of the best modes for carrying out the invention when taken in connection with the accompanying drawings.

DETAILED DESCRIPTION

Figure 1:
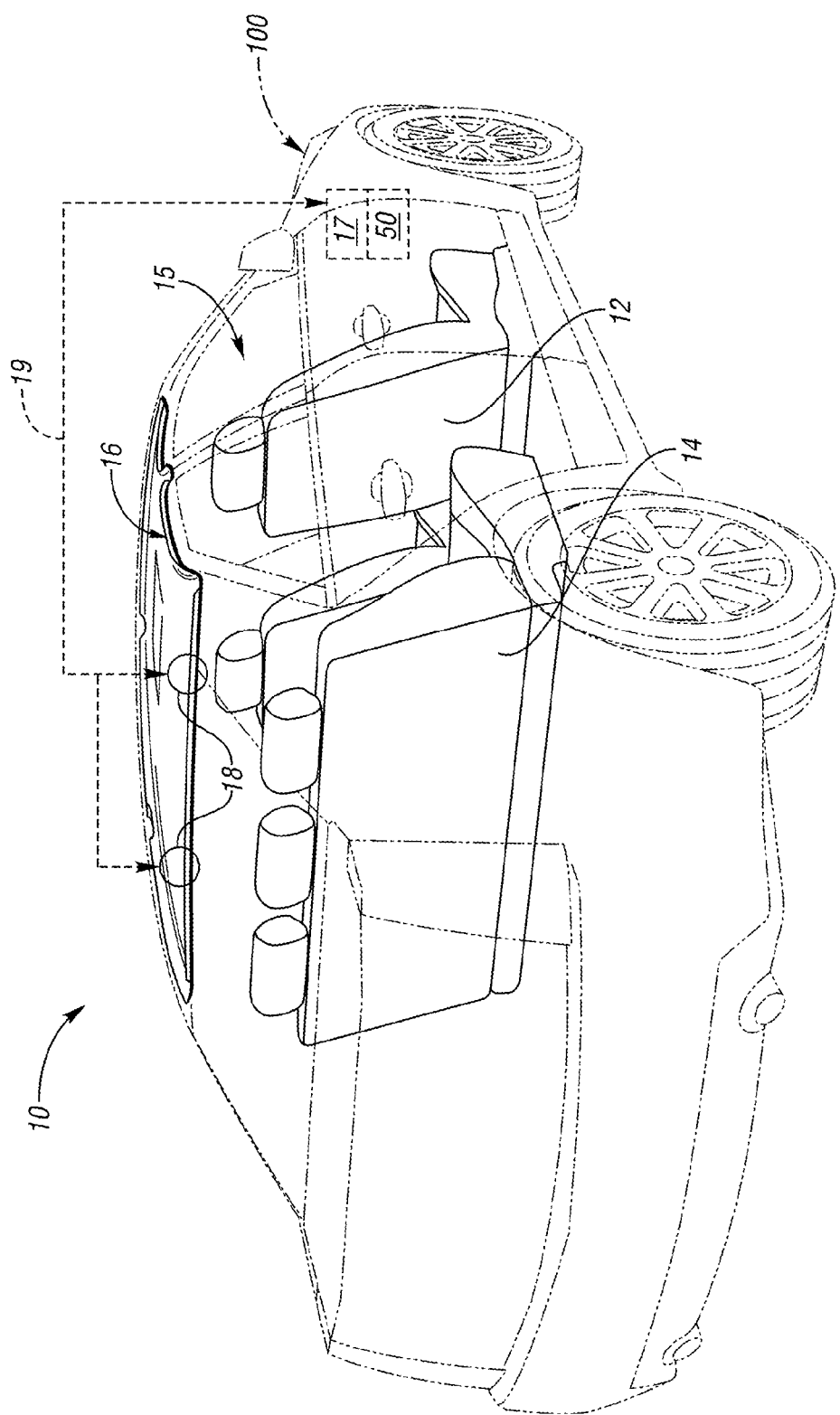
FIG. 1 is a schematic perspective view illustration of an example vehicle having an integral air vent and lamp assembly as described herein.

Referring to the drawings, wherein like reference numbers refer to the same or similar components throughout the several views, an example vehicle 10 having a body 100 is shown schematically in FIG. 1. The vehicle 10 includes a front row of seats 12 and at least one rear row of seats 14, i.e., behind the front row of seats 12 with respect to a normal direction of travel of the vehicle 10, all of which are located within a passenger cabin 15 that is defined by the body 100. A headliner 16 may be positioned above the respective front and rear rows of seats 12 and 14.

Figure 3:
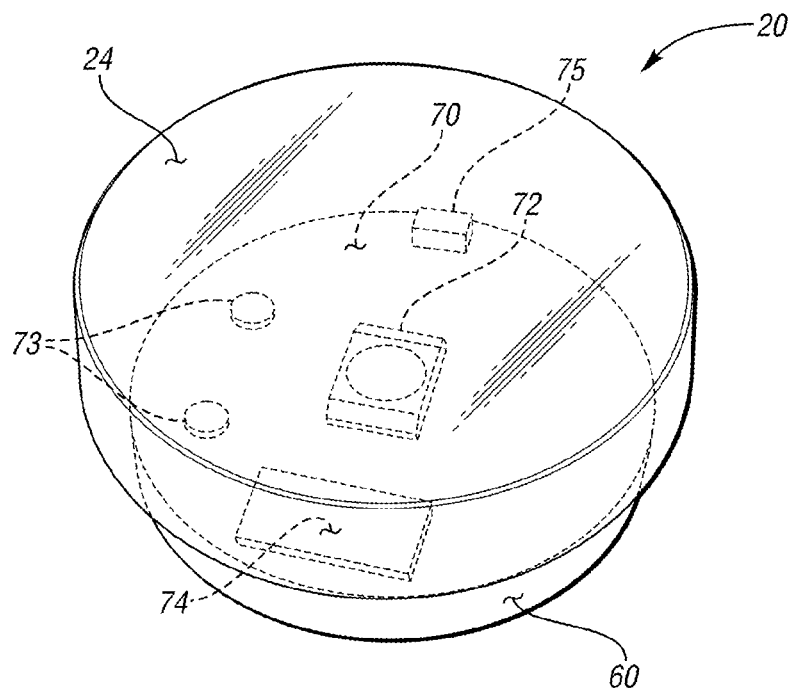
FIG. 3 is a schematic perspective view illustration of a lens and LED board of an example lamp assembly usable with the integral air vent and lamp assembly shown in FIG. 2.
Figure 4:
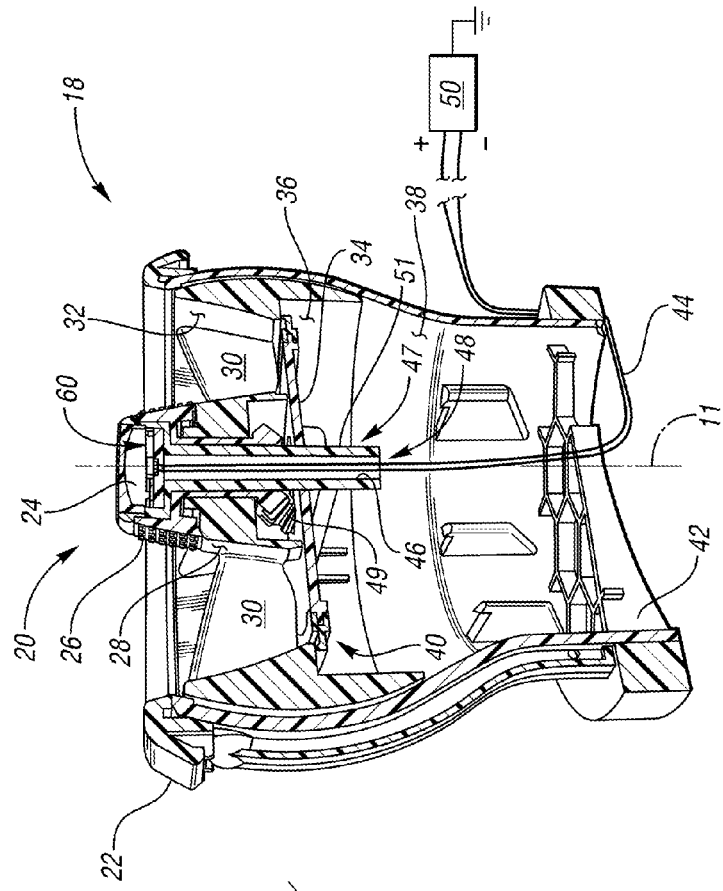
FIG. 4 is a schematic perspective cross-sectional side view illustration of the integral air vent and lamp assembly shown in FIG. 2.
Figure 5:
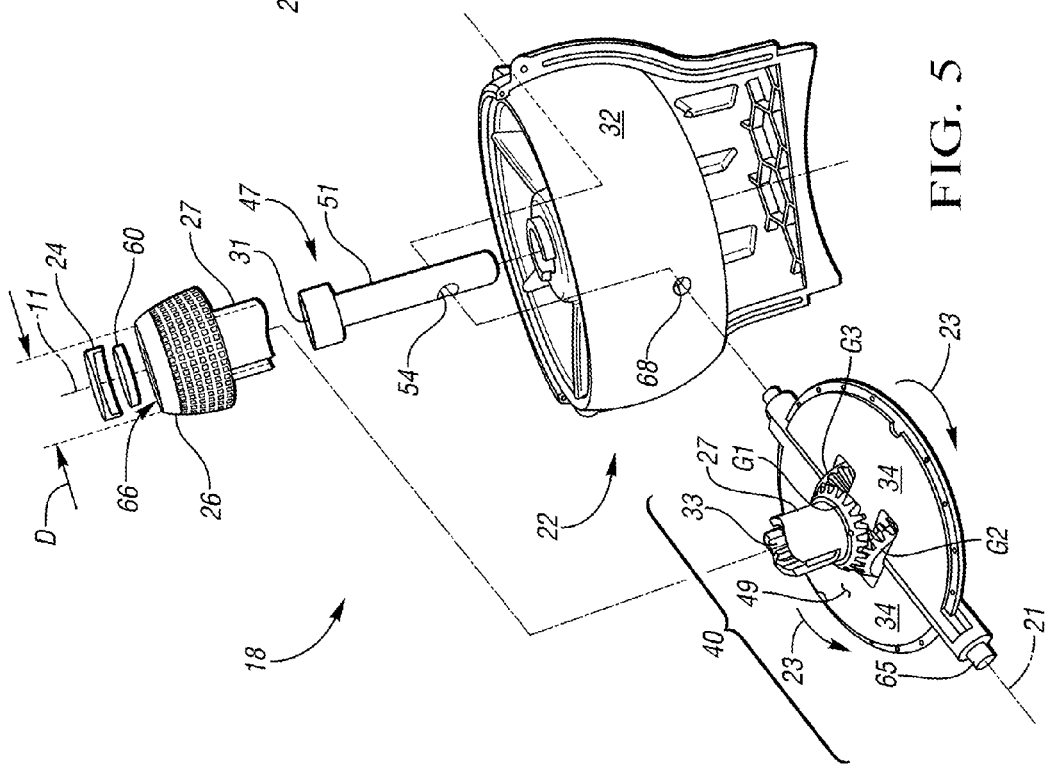
FIG. 5 is a schematic partial exploded perspective view illustration of the integral air vent and lamp assembly shown in FIGS. 2 and 4.

One or more integral air vent and lamp assemblies 18 of the present invention, two of which are shown schematically in the simplified example embodiment of FIG. 1, are positioned with respect to the headliner 16 directly or indirectly above the rear row of seats 14. In an alternative embodiment, the integral air vent and lamp assembly 18 may be positioned in other locations within the passenger cabin 15. While the example of a sedan-style vehicle 10 is described hereinafter for illustrative consistency, use of the integral air vent and lamp assembly 18 in other vehicles will be readily apparent to one having ordinary skill in the art, including but not limited to vans, sport utility vehicles, trucks, airplanes, trains, boats, or any other vehicle having a rear row of seats 14 for passengers who may desire conditioned air and lighting, along with independent control of each function. A similar concept may be extended to non-vehicular uses without departing from the intended inventive scope, provided conditioned or circulated air and electrical power are available at the desired point of use of the integral air vent and lamp assembly 18. The integral vent and lamp assembly 18, example embodiments of which are described below with reference to FIGS. 3-5, is in fluid communication with an air circulation device 17 and is electrically connected to a power source 50 of the vehicle 10, e.g., a rechargeable battery, a voltage regulator, an alternator, a combination of these elements, etc. The fluid and electrical communication is shown schematically in FIG. 1 as double-headed arrow 19.

Figure 2:
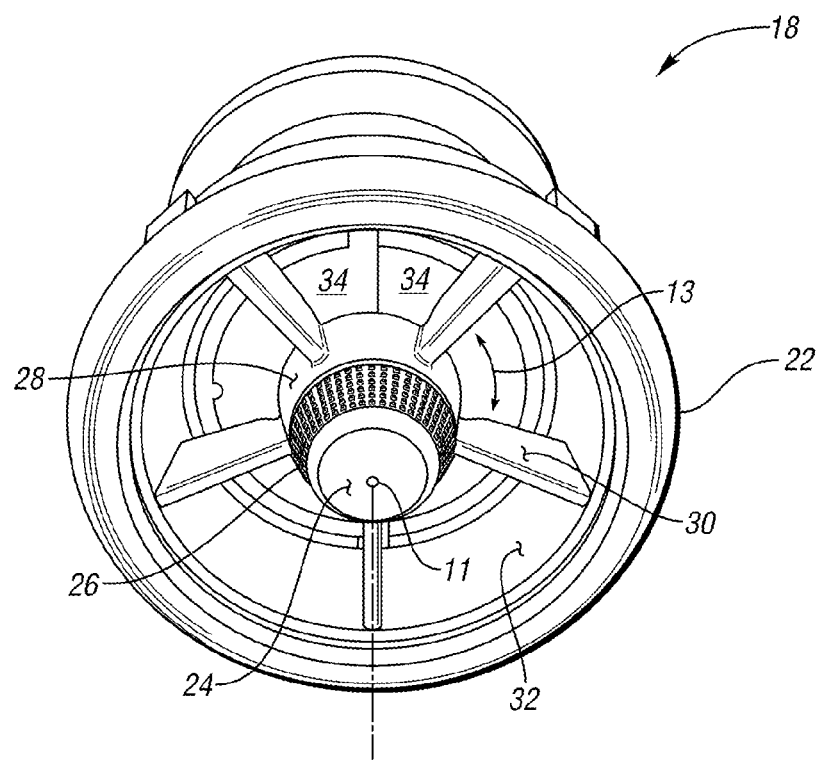
FIG. 2 is a schematic perspective view illustration of an integral air vent and lamp assembly usable with the example vehicle of FIG. 1.

Referring to FIG. 2, an embodiment of the integral vent and lamp assembly 18 is shown in schematic perspective view. The integral vent and lamp assembly 18 includes a lamp subassembly 20 (see FIGS. 3-5) that is arranged and centered on a center axis 11 of a rotary vent housing 22, which may be embodied as a circular air vent which may be rotated as indicated by double-headed arrow 13 to thereby actuate, i.e., open or close, a pair of air vent doors 34. Opening and closing the doors 34 respectively admits and blocks a flow of air into the passenger cabin 15 from the air circulation device 17. The lamp subassembly 20 may include a light diffusing lens 24, for instance a lens constructed of translucent clear or colored plastic, that is positioned with respect to and secured within a rotatable bezel 26 arranged on the center axis 11. The lamp subassembly 20 is arranged coaxially along the center axis 11 within a hub 28 of the rotary vent housing 22.

A plurality of air-diffusing blade members 30 may extend radially outward from the hub 28 toward an annular wall 32 of the rotary vent housing 22, with the blade members 30 being connected to each of the hub 28 and to the annular wall 32. As noted above, rotation of the bezel 26 by a passenger alternately opens and closes the pair of vent doors 34 of a vent control mechanism 40, with a perspective view of the vent control mechanism 40 shown in FIG. 4. Thus, a passenger seated in the rear row of seats 14 of FIG. 1 simply reaches up and selects a desired airflow setting ranging anywhere from fully closed/no airflow as shown in FIGS. 2, 4, and 5 to fully open/full airflow.

Referring briefly to FIG. 3, control of the lamp subassembly 20 of FIG. 2 may be entirely independent of control of the airflow setting, e.g., by pushing once on the light diffusing lens 24 to close an electrical circuit in the manner of conventional on/off push button micro-switch 72. Thus, a depression of the push-button micro-switch 72 changes an on/off state of the lamp assembly 20. The lamp subassembly 20 may include a light-emitting diode (LED) board 60, i.e., a printed circuit board assembly having a top surface 70 facing the light diffusing lens 24. One or more LEDs 73 may be mounted to the top surface 70 in this embodiment, such that any light emitted by the LEDs 73 toward passengers seated in the rear row of seats 14 of FIG. 1 is sufficiently diffused to produce the desired lighting effect. While only two LEDs 73 are shown for illustrative simplicity in FIG. 3, any number of LEDs 73 may be used.

Activation of the LEDs 73 may occur, as noted above, via depression of the light diffusing lens 24 in an example embodiment. To provide such a feature, the push-button micro-switch 72 may be used with the LED board 60 such that a depression of the light diffusing lens 24 closes the micro-switch 72 and connects the LEDs 73 to the power source 50 of FIG. 4. A subsequent depression of the light diffusing lens 73 disconnects the LEDs 73 from the power source 50. LED driver devices such as the example LED board 60 of FIG. 2 have multiple surface-mounted components to properly regulate the flow of power to the LEDs 73. Some of these components are shown schematically as a capacitor 74 and a resistor 75, although the number and type of components will vary with the wattage provided by the lamp subassembly 20. Heat sink components (not shown) may be used on the underside of the LED board 60 to manage thermal properties of the LED board 60, as is also well known in the art.

Internal detail of the integral vent and lamp assembly 18 of FIG. 2 is shown in FIG. 4. With reference to FIG. 4, the rotary vent housing 22 may be constructed of separate pieces of molded plastic in order to facilitate assembly. For instance, an air diffuser portion 36 having the annular wall 32 may be formed integrally with the hub 28 and the blade members 30, and then enclosed between a first shell 38 and a second shell 42 as shown. The respective first and second shells 38 and 42 may be snapped, bonded, or ultrasonically welded together to form the integral air and lamp assembly 18 of FIG. 2.

Rotary air vents similar to the example shown in FIGS. 2 and 4, but lacking the lamp subassembly 20 and the required internal structure as described below, are conventionally positioned adjacent to reading lamps in the rear seats of minivans and sport utility vehicles, as well as above the seats in aircraft and busses. The present approach takes advantage of existing packaging space within such rotary air vents by positioning the lamp subassembly 20 of FIGS. 4 and 5 along the center axis 11. The lamp subassembly 20 is then connected to the vent control mechanism 40 used to control airflow to the passenger cabin 15 of FIG. 1.

The light diffusing lens 24 may be positioned within an elongated T-shaped housing 47 of the lamp subassembly 20. The elongated T-shaped housing 47, which may be constructed of injection molded plastic or any other suitable material, may include a circumferential inner wall 46 which defines an axial center channel 48. A stem 51 of the elongated T-shaped housing 47, which is the elongated portion arranged along/coaxially with the center axis 11, is received within a gear set 49 of the vent control mechanism 40. This arrangement is also shown more clearly in FIG. 5. The LED board 60 is electrically connected to the power source 50, e.g., via conductive wires 44 routed from the power source 50 through the space within the rotary vent housing 22 through which air flows to the passenger cabin 15 of FIG. 1. The light diffusing lens 24 and the LED board 60 may be circumscribed by the bezel 26.

Referring to FIG. 5, the integral vent and lamp assembly 18 of FIGS. 2 and 4 is shown in partial exploded view to show additional internal detail. In the embodiment shown, the bezel 26, which may have a tapered annular shape and a textured exterior as shown to facilitate gripping and rotation, has a through opening 66 centered on the center axis 11. The elongated T-shaped housing 47 is received within the through opening 66. The stem 51 of the elongated T-shaped housing 47 is thus arranged coaxially with the center axis 11, and extends through the hub 28 of the rotary vent housing 22. The light diffusing lens 24 of the lamp subassembly 20 of FIG. 4 covers the LED board 60, and is inserted into a circular recess 31 in the elongated T-shaped housing 47. In any push button actuated embodiments, the diameter D of the through opening 66 should be slightly larger than a diameter of the light diffusing lens 24 so as to allow axial movement of the light diffusing lens 24 along the center axis 11 during activation of the lamp subassembly 20. In other embodiments, e.g., switch-activated lighting, this feature may not be required, and the light diffusing lens 24 may simply be bonded in place within the through opening 66.

The bezel 26 of FIG. 5 may be connected to or formed integrally with an axial member 27. The axial member 27, which has an inner surface 33 and extends between the bezel 26 and the gear set 49 of the vent control mechanism 40, is shown broken and separated in FIG. 4 solely for illustrative clarity, with a portion connected to the bezel 26 and another portion connected to the gear set 49. The axial member 27 may be formed as one piece in a typical embodiment. The axial stem portion 51 of the elongated T-shaped housing 47 is inserted into axial member 27 such that the axial stem portion 51 is radially inward of the inner surface 33. As is known by those having ordinary skill in the art, the doors of a rotary air vent, such as the pair of vent doors 34 of the example rotary vent housing 22 of FIG. 5, typically operate via rotation of intermeshed gear elements of a gear set. This is the function of the gear set 49, which may be optionally embodied as a set of miter or bevel gears.

For instance, a main gear G1 may circumscribe the axial member 27 and may be bonded or otherwise affixed thereto, such that rotation of the axial member 27, when a passenger rotates the bezel 26, also rotates the connected main gear G1. Intermeshed gears G2 and G3 arranged orthogonally to the center axis 11 on another axis 21 rotate to cause the pair of vent doors 34 to rotate about axis 21 in the direction of arrows 23, thus opening the vent doors 34. This allows the air to flow into the passenger cabin 15 of FIG. 1. Rotation of the main gear G1 in a direction opposite that of arrow 23 in turn closes the doors 34 and thus blocks airflow to the passenger cabin 15.

The entire vent control mechanism 40 of FIG. 5 may be inserted into the rotary vent housing 22. In a possible configuration, the vent control mechanism 40 may include a guide pin 65 arranged along the axis 21, and the rotary vent housing 22 may define a pair of holes 68, only one of which is visible from the perspective of FIG. 5. The guide pin 65 may be inserted into the pair of holes 68 such that the vent control mechanism 40 is laterally supported by the rotary vent housing 22. For added support, the guide pin 65 may also be inserted through an opening 54 in the axial stem portion 51 of the elongated T-shaped housing 47. This step may be performed prior to disposing the elongated T-shaped housing 47 within the axial member 27 to facilitate assembly.

Use of the integral vent and lamp assembly 18 described above, in lieu of separate conventional vent and lighting device, may help to reduce component count in the vehicle 10 while also improving design flexibility within the passenger cabin 15. That is, the air vent and lamp assembly 18 may be sourced as a single component having two separate functions: delivering conditioned or unconditioned air from the air circulation device 17 and also directing useful task lighting to the same passengers, with these functions being independently selectable. This and other possible advantages will be appreciated from the above description of the various example embodiments shown in FIGS. 1-5.

While the best modes for carrying out the invention have been described in detail, those familiar with the art to which this invention relates will recognize various alternative designs and embodiments for practicing the invention within the scope of the appended claims.

The invention claimed is:

1. An integral air vent and lamp assembly for a vehicle having a body defining a passenger cabin, and having an air circulation device and a power source, the assembly comprising:
   a rotary vent housing in fluid communication with the air circulation device, and having a hub that defines an opening centered on a center axis of the rotary vent housing, wherein the rotary vent housing includes a pair of vent doors that open and close to respectively admit or block a flow of air from the air circulation device into the passenger cabin;
   a lamp subassembly disposed within the opening of the hub, wherein the lamp subassembly is electrically connectable to the power source; and
   a gear set that is operatively connected to the pair of vent doors and that has a gear element, wherein the lamp subassembly includes an elongated axial member that is received by and rotates in conjunction with the gear element to open and close the pair of vent doors.

2. The assembly of claim 1, wherein the lamp subassembly includes a push-button micro-switch, wherein a depression of the push-button micro-switch changes an on/off state of the lamp assembly.

3. The assembly of claim 1, wherein the lamp subassembly includes a plurality of light-emitting diodes (LEDs).

4. The assembly of claim 3, wherein the lamp subassembly includes an elongated T-shaped housing having the elongated axial member and defining a recess, and further includes a light diffusing lens and an LED board on which is mounted the plurality of LEDs, and wherein the light diffusing lens and the LED board are positioned within the recess of the elongated T-shaped housing.

5. The assembly of claim 1, further comprising a bezel that is coaxially arranged with respect to the center axis, wherein the lamp assembly includes a light diffusing lens covering a light-emitting diode (LED) board, and wherein the light diffusing lens and the LED board are circumscribed by the bezel.

6. The assembly of claim 1, wherein the hub includes an annular wall and a plurality of air-diffusing blade members that extend radially outward from the hub toward the annular wall.

7. A vehicle comprising:
   a body defining a passenger cabin;
   a power source;
   an air circulation device configured to move air to the passenger cabin; and
   an integral air vent and lamp assembly having:
      a rotary vent housing positioned in the passenger cabin in fluid communication with the air circulation device, and having a hub that defines an opening centered on a center axis of the rotary vent housing, wherein the rotary vent housing includes a pair of vent doors that open and close to respectively admit or block a flow of air from the air circulation device into the passenger cabin;
      a gear set that is operatively connected to the pair of vent doors and that has a gear element; and
      a lamp subassembly that is electrically connected to the power source, wherein the lamp subassembly is disposed within the opening of the hub, wherein the lamp subassembly includes an elongated axial member that is received by and rotates in conjunction with the gear element to open and close the pair of vent doors.

8. The vehicle of claim 7, wherein the vehicle includes a headliner and a rear row of seats, and wherein the rotary vent housing is positioned with respect to the headliner.

9. The vehicle of claim 7, wherein the lamp assembly includes a push-button micro-switch, wherein a depression of the push-button micro-switch changes an on/off state of the lamp assembly.

10. The vehicle of claim 7, wherein the lamp subassembly includes a plurality of light-emitting diodes (LEDs).

11. The vehicle of claim 10, wherein the lamp subassembly includes an elongated T-shaped housing having the axial member and defining a recess, a light diffusing lens, and an LED board on which is mounted the plurality of LEDs, and wherein the light diffusing lens and the LED board are positioned within the recess of the elongated T-shaped housing.

12. The vehicle of claim 7, wherein the integral air vent and lamp assembly includes a bezel that is coaxially arranged with respect to the center axis, wherein the lamp assembly includes a light diffusing lens covering a light-emitting diode (LED) board, and wherein the light diffusing lens and the LED board are circumscribed by the bezel.

13. The vehicle of claim 7, wherein the hub includes an annular wall and a plurality of air-diffusing blade members that extend radially outward from the hub toward the annular wall.

14. An integral air vent and lamp assembly for a vehicle having a body defining a passenger cabin, and also having an air circulation device and a power source, the assembly comprising:
   a rotary vent housing in fluid communication with the air circulation device, and having a pair of vent doors and a hub, wherein the hub defines an opening centered on a center axis of the rotary vent housing and wherein the pair of vent doors are operable to open and close to respectively admit and block a flow of air from the air circulation device into the passenger cabin;
a lamp subassembly that is disposed within the opening of the hub, and that includes:
an elongated T-shaped member having an elongated axial member and defining a recess and an axial center channel within the elongated axial member;
a light-emitting diode (LED) board having a plurality of LEDs and a push-button micro-switch;
wires that electrically connect the LED board to the power source; and
a light diffusing lens covering the LED board, wherein the light diffusing lens and the LED board are disposed within the recess of the elongated T-shaped member; and
a gear set that is operatively connected to the pair of vent doors and has a gear element, wherein the elongated axial member is received by and rotates in conjunction with the gear element to open and close the pair of vent doors.

15. The assembly of claim 14, further comprising a bezel that is coaxially arranged with respect to the center axis, wherein the lamp subassembly includes a light diffusing lens covering a light-emitting diode (LED) board, and wherein the light diffusing lens and the LED board are circumscribed by the bezel.

16. The assembly of claim 14, wherein the hub includes an annular wall and a plurality of air-diffusing blade members that extend radially outward from the hub toward the annular wall.

\* \* \* \* \*